(12) United States Patent
Akahane

(10) Patent No.: US 10,162,160 B2
(45) Date of Patent: Dec. 25, 2018

(54) MICROSCOPE OBJECTIVE

(71) Applicant: OLYMPUS CORPORATION, Hachioji-shi, Tokyo (JP)

(72) Inventor: Masaki Akahane, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/385,652

(22) Filed: Dec. 20, 2016

(65) Prior Publication Data

US 2017/0184830 A1    Jun. 29, 2017

(30) Foreign Application Priority Data

Dec. 25, 2015  (JP) .................................. 2015-254440

(51) Int. Cl.
| | |
|---|---|
| *G02B 21/02* | (2006.01) |
| *G02B 21/34* | (2006.01) |
| *G02B 21/00* | (2006.01) |
| *G02B 27/00* | (2006.01) |

(52) U.S. Cl.
CPC ......... *G02B 21/02* (2013.01); *G02B 21/0088* (2013.01); *G02B 21/34* (2013.01); *G02B 27/0025* (2013.01)

(58) Field of Classification Search
CPC .... G02B 21/02; G02B 21/0088; G02B 21/34; G02B 27/0025
USPC ................... 359/368–398, 656–661
See application file for complete search history.

(56) References Cited

U.S. PATENT DOCUMENTS

| | | | | |
|---|---|---|---|---|
| 4,666,256 | A | * | 5/1987 | Shimizu ............. G02B 27/0068 359/658 |
| 5,444,573 | A | | 8/1995 | Saito |
| 5,861,996 | A | | 1/1999 | Yamaguchi |
| 2008/0180805 | A1 | | 7/2008 | Yonetani |
| 2008/0212199 | A1 | | 9/2008 | Yonetani |
| 2010/0103530 | A1 | | 4/2010 | Yonetani |
| 2012/0113524 | A1 | * | 5/2012 | Kasahara ............... G02B 21/33 359/656 |

(Continued)

FOREIGN PATENT DOCUMENTS

| | | |
|---|---|---|
| JP | 09292571 A | 11/1997 |
| JP | 10133118 A | 5/1998 |
| JP | 2891369 B2 | 5/1999 |

(Continued)

*Primary Examiner* — Jie Lei
*Assistant Examiner* — Mitchell Oestreich
(74) *Attorney, Agent, or Firm* — Holtz, Holtz & Volek PC

(57) ABSTRACT

A dry microscope objective includes in order starting from the object side a first lens group having a positive power, that includes single lenses, a second lens group that can move along an optical axis, and a third lens group including two concave surfaces that are air-contacting surfaces adjacent to and facing each other. Only one surface is a concave surface from among four surfaces consisting of a first lens surface, a second lens surface, a third lens surface and a fourth lens surface. The objective satisfies $$0.66 \leq NA \leq 1 \tag{1}$$

$$0.2 < |\Delta d / r_1| < 1 \tag{2}$$

where NA is a numerical aperture of the objective, $\Delta d$ is a sum of a lens interval between the first and second lens surfaces and a lens interval between the third and fourth lens surfaces, and $r_1$ is a curvature radius of the concave surface from among the four surfaces.

7 Claims, 13 Drawing Sheets

(56) References Cited

U.S. PATENT DOCUMENTS

2013/0222920 A1    8/2013  Fujita

FOREIGN PATENT DOCUMENTS

| | | | |
|---|---|---|---|
| JP | 11281891 | A | 10/1999 |
| JP | 3313163 | B2 | 8/2002 |
| JP | 2003098438 | A | 4/2003 |
| JP | 2005352021 | A | 12/2005 |
| JP | 2008185965 | A | 8/2008 |
| JP | 2012083789 | A | 4/2012 |
| JP | 2013178309 | A | 9/2013 |

* cited by examiner

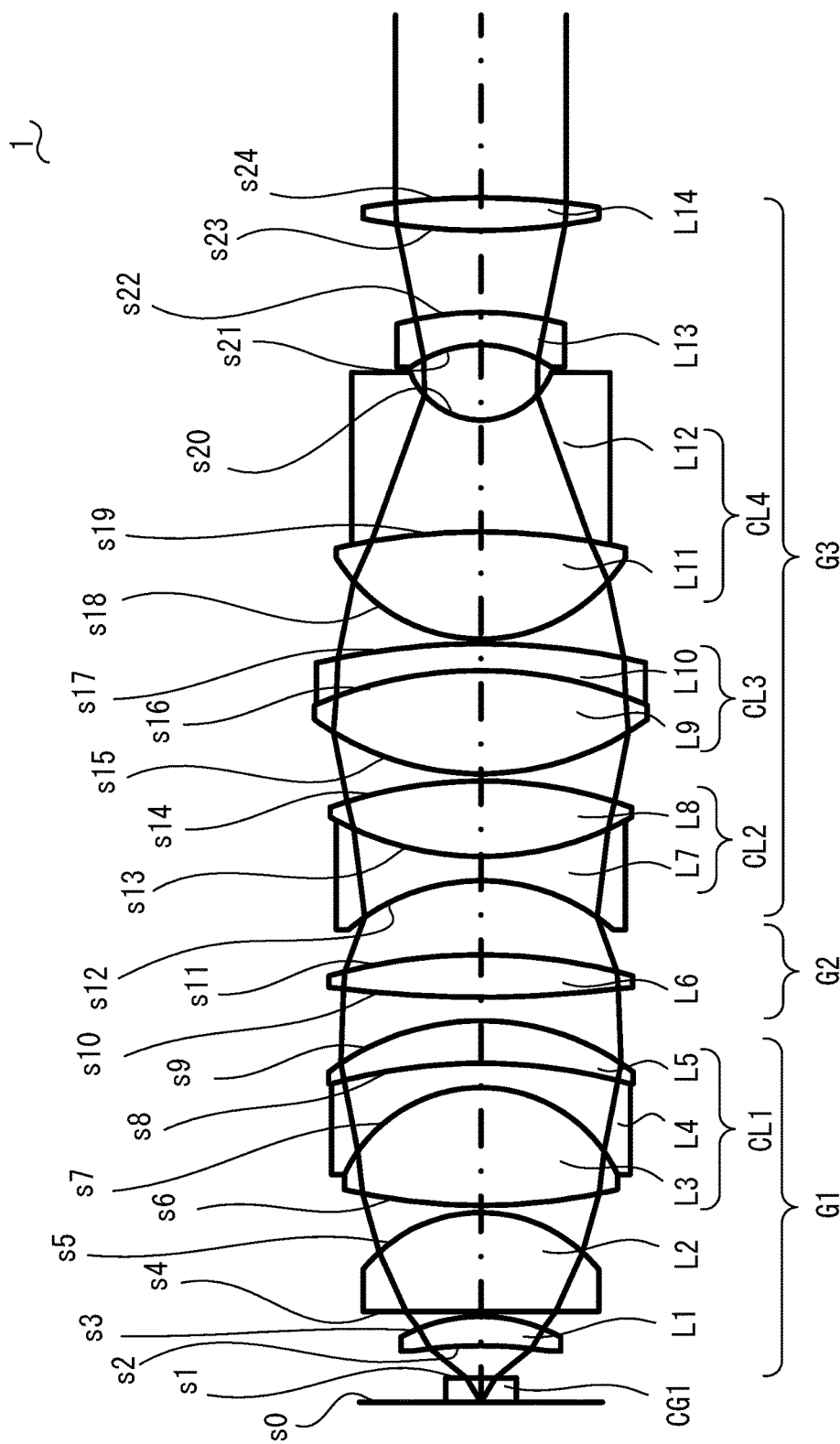
F I G. 1

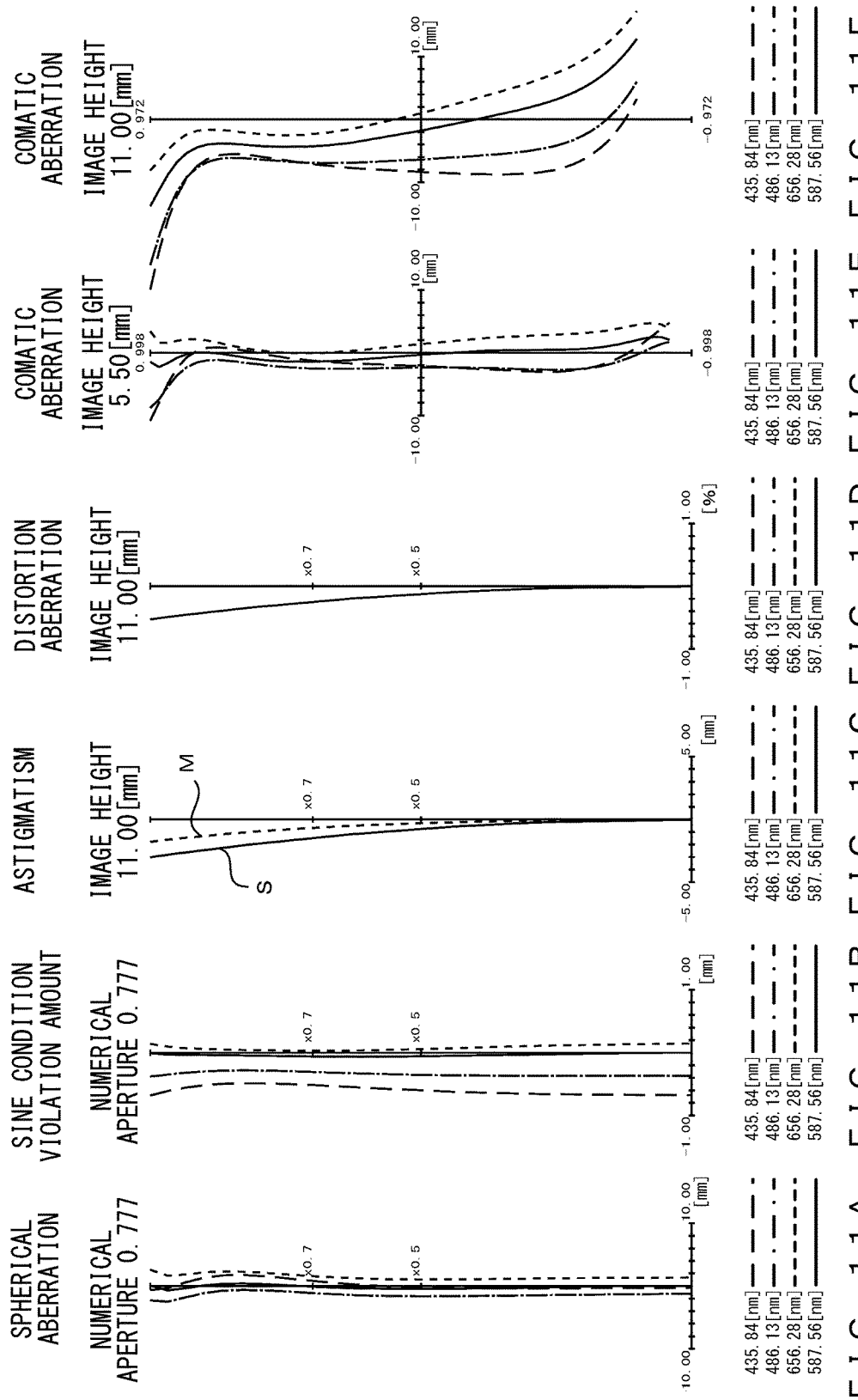

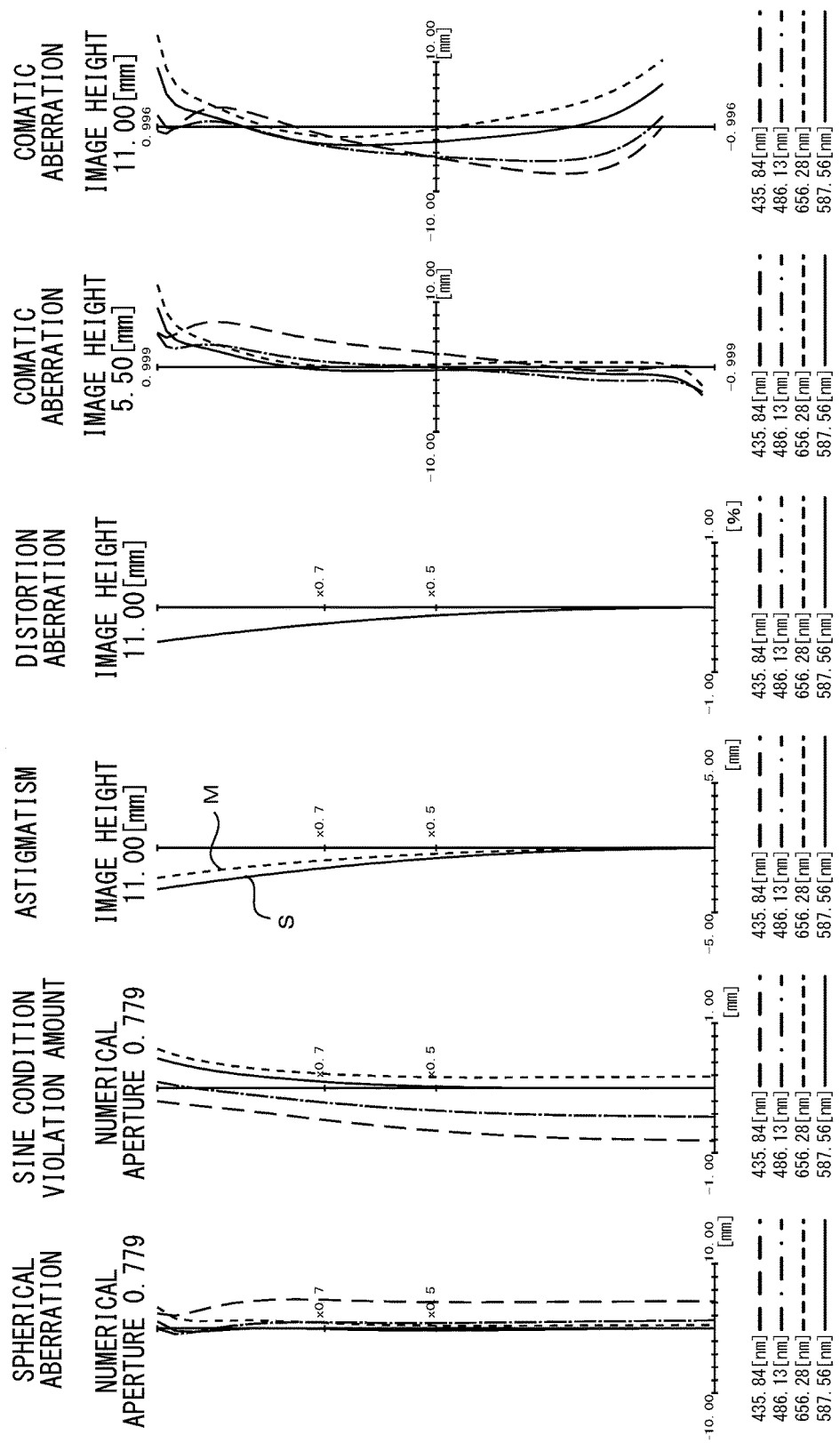

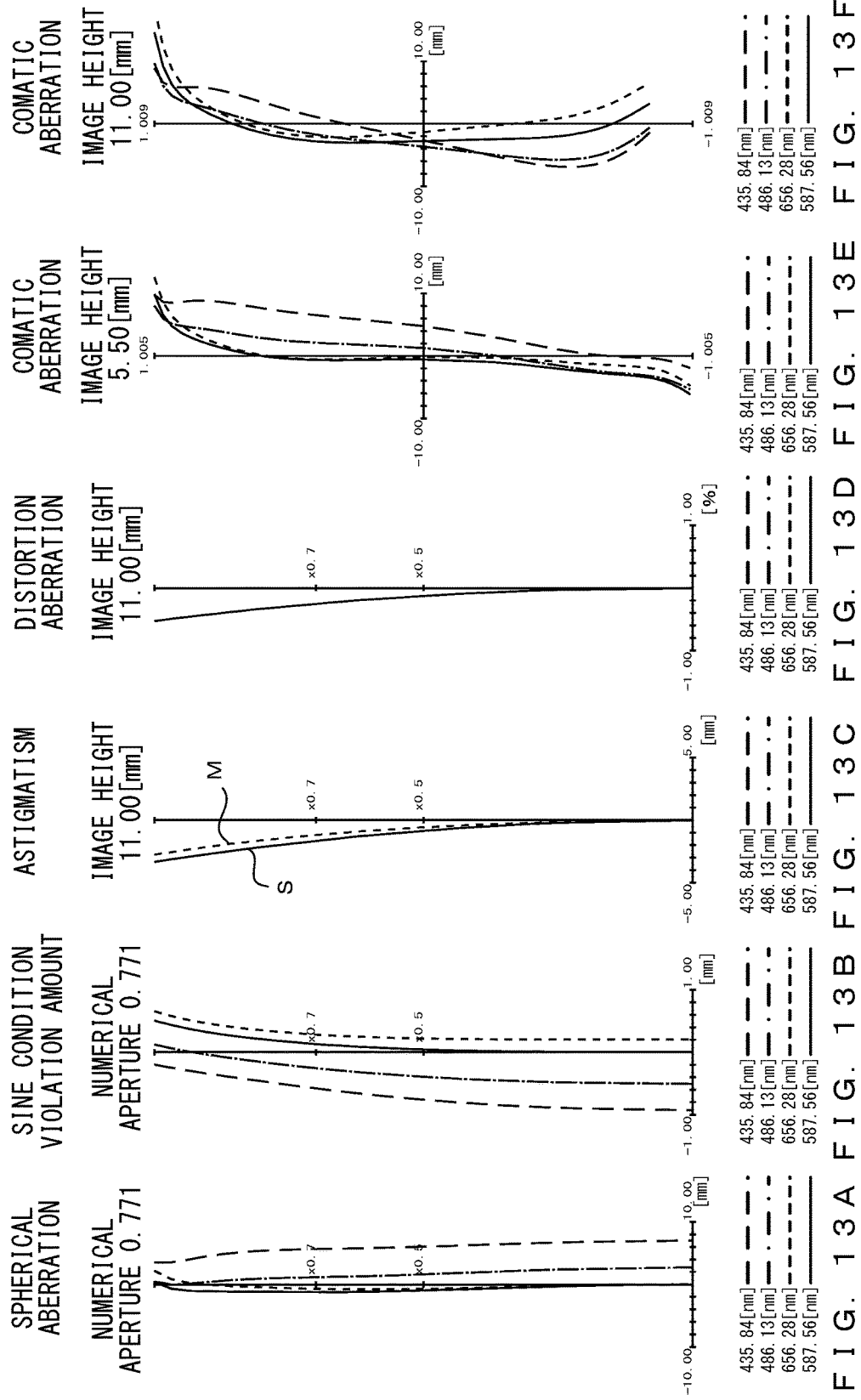

MICROSCOPE OBJECTIVE

CROSS REFERENCE TO RELATED APPLICATIONS

This application is based upon and claims the benefit of priority from prior Japanese Patent Application No. 2015-254440, filed Dec. 25, 2015, the entire contents of which are incorporated herein by this reference.

BACKGROUND OF THE INVENTION

Field of the Invention

The present invention is related to a microscope objective and particularly to a dry microscope objective.

Description of the Related Art

In the field of biology, inverted microscopes are often used for observing a sample such as a cultured cell. Observation magnifications from around 20× through 60× are often used because a plurality of cultured cells are often observed at a time.

In an inverted microscope, light from the sample enters the objective via a sample container or a slide glass. Examples of a sample container include a glass petri dish, a plastic dish, etc. Lengths of sample containers range from approximately 0.15 mm, which is similar to that of a cover glass, to approximately 1 mm.

This has created demands for a microscope objective that has a mechanism for correcting aberrations caused by variation in thickness of a slide glass, a cover glass, a petri dish, a dish, etc. (these elements will collectively be referred to as a sample holding member hereinafter) that is disposed between the sample and the objective. Such an objective is disclosed by for example Japanese Laid-open Patent Publication No. 2005-352021. Example 1 of Japanese Laid-open Patent Publication No. 2005-352021 discloses an objective that can correct aberrations in a cover glass with a thickness from approximately 0 mm through 2 mm, and can also suppress excellently aberrations including a chromatic aberration, field curvature, etc.

SUMMARY OF THE INVENTION

An aspect of the present invention provides a dry microscope objective. That dry microscope objective includes, in order starting from object side, a first lens group, having a positive power, that includes a plurality of single lenses, a second lens group that can move along the optical axis and a third lens group that includes two concave surfaces that are air-contacting surfaces adjacent to and facing each other. Only one surface is a concave surface from among four surfaces consisting of a first lens surface that is a lens surface closest to an image in the first lens group, a second lens surface that is a lens surface closest to an object in the second lens group, a third lens surface that is a lens surface closest to an image in the second lens group and a fourth lens surface that is a lens surface closest to an object in the third lens group. The dry microscope objective satisfies $$0.66 \leq NA \leq 1 \quad (1)$$

$$0.2 < |\Delta d/r_1| < 1 \quad (2)$$

where NA is a numerical aperture on an object side of the dry microscope objective, $\Delta d$ is a sum of a lens interval between the first and second lens surfaces and a lens interval between the third and fourth lens surfaces, and $r_1$ is a curvature radius of a lens surface that is the concave surface from among the four surfaces.

Another aspect of the invention provides a dry microscope objective. The dry microscope objective includes, in order starting from the object side, a first lens group having a positive power, a second lens group that can move along an optical axis, and a third lens group including two concave surfaces that are air-contacting surfaces adjacent to and facing each other. The dry microscope objective satisfies $$0.66 \leq NA \leq 1 \quad (1)$$

$$0.3 < (di + Ti/N_d)/f < 0.77 \quad (7)$$

where NA is a numerical aperture on an object side of the dry microscope objective, this an optical working distance when a sample holding member with a refractive index of $N_d$ and a thickness of $T_i$ is used for observation and f is a focal length of the dry microscope objective.

BRIEF DESCRIPTION OF THE DRAWINGS

The present invention will be more apparent from the following detailed description when the accompanying drawings are referenced.

FIG. 1 is a sectional view of an objective according to example 1 where the cover glass thickness is 1 mm;

FIG. 11A through FIG. 11F are aberration diagrams in a case when the objective in example 3 and the tube lens of FIG. 2 are used in combination where the cover glass thickness is 0 mm;

FIG. 12A through FIG. 12F are aberration diagrams in a case when the objective in example 3 and the tube lens of FIG. 2 are used in combination where the cover glass thickness is 1 mm; and FIG. 13A through FIG. 13F are aberration diagrams in a case when the objective and the tube lens of FIG. 2 are used in combination in example 3 where the cover glass thickness is 1.6 mm.

DESCRIPTION OF THE EMBODIMENTS

Figure 2:
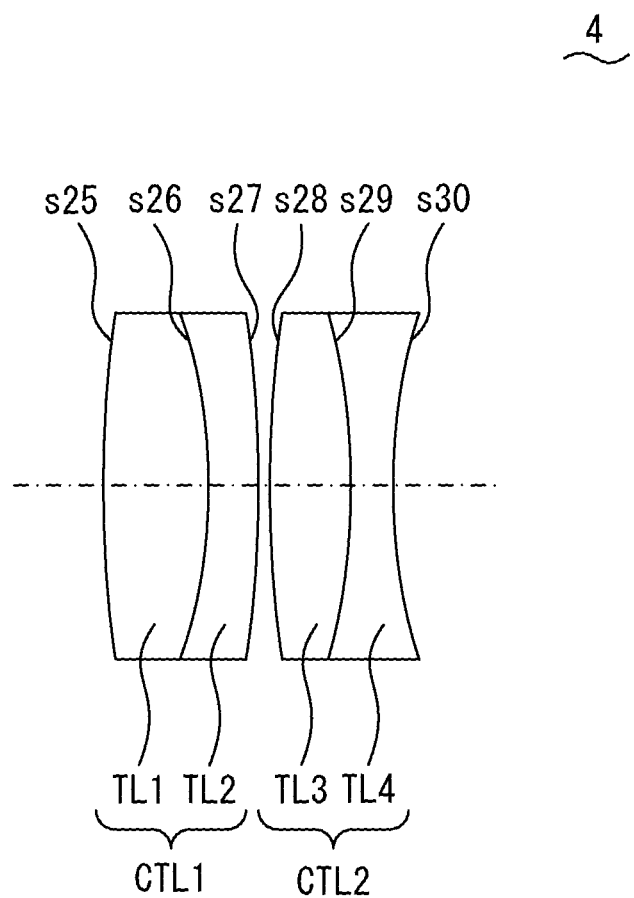
FIG. 2 is a sectional view of tube lens used in combination with the objective of example 1.

When fluorescence observation is performed on cultured cells, it is desirable that cell toxicity be reduced as much as possible. This creates a demand for a microscope objective that efficiently detects faint fluorescence caused by a limited amount of excitation light and that yields high resolution. In view of this, the objective described in example 1 of Japanese Laid-open Patent Publication No. 2005-352021 has a numerical aperture of 0.6, which is not sufficient, although it can be used with various cover-glass thicknesses.

Explanations will be given for an objective of an embodiment of the present invention. An objective according to the present embodiment is a dry microscope objective and is an infinity-corrected microscope objective that is used in combination with a tube lens.

The microscope objective has a three-group configuration including a moving group. The objective has a lens configuration including a first lens group, a second lens group and a third lens group in order starting from the object side. The first lens group includes a plurality of single lenses and has a positive power. The second lens group is a moving group that can move along the optical axis. The third lens group has two concave surfaces that are air-contacting surfaces adjacent to and facing each other. The objective further moves the second lens group in the optical-axis directions when a spherical aberration is corrected.

In the objective, only one of the four surfaces, each of which is a surface facing the other group in its group, is a concave surface. "Four surfaces" described herein refers specifically to a first lens surface, which is the lens surface closest to the image in the first lens group, a second lens surface, which is the lens surface closest to the object in the second lens group, a third lens surface, which is the lens surface closest to the image in the second lens group, and a fourth lens surface, which is the lens surface closest to the object the third lens group. Note that "lens surface closest to the object" describes a lens surface closest to the object plane, i.e., a lens surface closest to the front focal plane of the objective. "Lens surface closest to the image" is a lens surface closest to the image plane.

The objective is further configured to satisfy conditional expressions (1) and (2) below. In the conditional expressions, NA is the numerical aperture on the object side of the objective. $\Delta d$ is the sum of the lens interval between the first and second lens surfaces and the lens interval between the third and fourth lens surfaces. $r_1$ is the curvature radius of the lens surface that is a concave surface among the four surfaces above.

$$0.66 \leq NA \leq 1 \quad (1)$$

$$0.2 < |\Delta d/r_1| < 1 \quad (2)$$

Conditional expression (1) defines the resolution and the brightness of a sample image formed by the objective. Because the objective is a dry objective, NA does not exceed 1. NA smaller than the lower limit value of conditional expression (1) often results in insufficient resolution and brightness of the image. In fluorescence observation, the amount of illumination light is limited in order to suppress the cell toxicity. This often results in insufficient brightness particularly.

Conditional expression (2) defines a tolerated level of a change in a spherical aberration amount caused in accordance with the thickness of the sample holding member. The greater $\Delta d$ is and the smaller $r_1$ is, the greater the change in the spherical aberration amount that can be responded to for correcting the spherical aberration excellently is. This is because the greater $\Delta d$ is, the more the moving group can move and even small $r_1$ can greatly change the refraction amount of the rays in the objective. This is also because the smaller $r_1$ is, the more the rays refract in the concave surface and even a short movable distance of a moving group can greatly change the refraction amount of the rays in the objective.

$|\Delta d/r_1|$ equal to or greater than the upper limit value of conditional expression (2) curves the rays in the objective too greatly. This makes it difficult to correct comprehensively various types of aberrations including an off-axis aberration etc. $|\Delta d/r_1|$ equal to or smaller than the lower limit value of conditional expression (2) reduces the change amount of a spherical aberration that can be responded to. This makes it difficult to respond sufficiently to differences between assumed thicknesses of a sample holding member. This limits sample holding members (a cover glass itself, a petri dish, a dish, etc.) that are used for observation.

According to the objective configured as described above, it is possible to correct excellently aberrations by responding to differences in the thicknesses of various types of sample holding members while having the numerical aperture high. Explanations will be given for a further desirable configuration of the objective.

It is desirable in the objective that the lens component including a concave surface among the above four surfaces be a two-piece cemented lens. It is further desirable that conditional expression (3) below be satisfied. In the conditional expression, $v_1$ is the Abbe number of the lens including the concave surface. $v_2$ is the Abbe number of the lens cemented together with the lens including the concave surface.

$$25 < |v_1 - v_2| < 50 \quad (3)$$

Conditional expression (3) defines the Abbe number difference of lenses constituting the two-piece cemented lens. Configuring a lens component including a concave surface as a two-piece cemented lens and designing the Abbe number difference appropriately makes it possible to correct a longitudinal chromatic aberration (also referred to as an on-axis chromatic aberration) excellently. $|v_1 - v_2|$ equal to or greater than the upper limit value of conditional expression (3) results in too great an Abbe number difference. This results in excessive correction on C and F rays. This makes correction of a chromatic aberration of short wavelengths difficult particularly. $|v_1 - v_2|$ equal to or smaller than the lower limit value of conditional expression (3) results in too small an Abbe number difference. This makes it difficult to perform excellent correction of a chromatic aberration with various wavelengths including C and F rays.

It is desirable that the first lens group include a three-piece cemented lens in which a positive lens, a negative lens and a positive power are cemented in order starting from the object side. Inclusion of a three-piece cemented lens makes it possible to correct a chromatic aberration further excellently, which works advantageously when for example correcting a secondary spectrum. Also, a refraction surface can be increased without increasing the air-contacting surface. This also creates anticipation of an effect of suppressing the occurrence of a flare.

It is desirable that the third lens group include, closest to the image, a single lens having a positive power and that it further satisfy conditional expression (4). In the conditional expression, f is the focal length of the objective. $f_{31}$ is the focal length of the single lens closest to the image included in the third lens group.

$$3 < f_{31}/f < 5 \quad (4)$$

Conditional expression (4) defines the ratio between the focal length of the single lens closest to the image and the focal length of the objective. Satisfying conditional expression (4) makes it possible to correct a comatic aberration and an astigmatism with a good balance. $f_{31}/f$ equal to or greater than the upper limit value of conditional expression (4) results in too large an occurrence amount of an astigmatism, deteriorating the imaging performance in the periphery of the image (which will be referred to as a peripheral performance hereinafter). $f_{31}/f$ equal to or smaller than the lower limit value of conditional expression (4) results in too large an occurrence amount of an comatic aberration, deteriorating the peripheral performance.

It is desirable that the objective satisfy conditional expression (5) below. In the conditional expression, $T_{max}$ and $T_{min}$ are respectively the maximum and minimum values of the thicknesses of a sample holding member that can be tolerated by the specification of the objective. $d_{min}$ is the optical working distance when a sample holding member with a thickness of $T_{max}$ is used. In other words, it is the distance from the surface on the objective side of the sample holding member to the lens surface closest to the object of the objective with the focus on a sample side surface of the sample holding member having a thickness of $T_{max}$. $N_d$ is the refractive index of a sample holding member used for the observation.

$$0.6 < (T_{max} - T_{min})/N_d/d_{min} < 3.0 \quad (5)$$

Satisfying conditional expression (5) makes it possible to correct excellently a spherical aberration caused by differences in the thicknesses of sample holding members without sacrificing the manipulability of the objective. $(T_{max}-T_{min})/N_d/d_{min}$ equal to or greater than the upper limit value of conditional expression (5) often make the objective and the sample holding member contact each other during the manipulation of the objective. This makes it impossible to maintain high manipulability. $(T_{max}-T_{min})/N_d/d_{min}$ equal to or greater than the lower limit value of conditional expression (5) imposes limitations on sample holding members that can be used. This results in lack of versatility and makes the application to, particularly, inverted microscopes difficult.

The "working distance" of a microscope objective is determined as a distance to the sample holding member with consideration to the frame etc. of the objective when the surface closest to the object is a concave surface. However, the "optical working distance" used herein does not consider the frame etc., and is defined by a distance on the optical axis from the surface closest to the object in the microscope objective to the surface closest to the image in the sample holding member.

It is desirable that the second lens group be a single lens having a positive power and that it further satisfy conditional expression (6) below. In the conditional expression, f is the focal length of the objective. $f_2$ is the focal length of the second lens group.

$$4 < f_2/f < 6 \quad (6)$$

Conditional expression (6) defines the ratio between the focal length of the second lens group and the focal length of the objective. Satisfying conditional expression (6) makes it possible to correct excellently a spherical aberration that changes greatly, while maintaining the off-axis performance, which depends upon the field curvature, at a high level. $f_2/f$ equal to or greater than the upper limit value of conditional expression (6) makes it difficult to respond to the change amount of a great spherical aberration while maintaining the off-axis performance. $f_2/f$ equal to or smaller than the lower limit value of conditional expression (6) results in too great an occurrence amount of field curvature, making it difficult to achieve excellent off-axis performance.

It is desirable that the objective satisfy conditional expression (7) below. In the conditional expression, di is the optical working distance when a sample holding member with a refractive index of $N_d$ and a thickness of $T_i$ is used for observation.

$$0.3 < (d_i + T_i/N_d)/f < 0.77 \quad (7)$$

Conditional expression (7) defines the ratio between the air conversion length from the object plane to the lens surface closest to the object in the objective and the focal length of the objective. $(d_i+T_i/N_d)/f$ equal to or greater than the upper limit value of conditional expression (7) results in too short a focal length of the objective. This prevents observation with the sample enlarged at a magnification required for the observation. $(d_i+T_i/N_d)/f$ equal to or smaller than the lower limit value of conditional expression (7) results in too short a distance from the object plane to the lens surface closest to the object in the objective. This often makes the objective and the sample holding member contact each other during the manipulation of the objective, making it impossible to maintain high manipulability. Satisfying conditional expression (7) makes it possible to observe the sample enlarged at a magnification required for the observation while maintaining high manipulability. Specific explanations will be given for examples of the above objective.

EXAMPLE 1

FIG. 1 is a sectional view of an objective 1 according to the present example. FIG. 1 shows the lens position in a case where cover glass CG1 with a thickness of 1 mm is disposed between the sample and the objective 1.

The objective 1 is a dry microscope objective. The objective 1 includes, in order starting from the object side, first lens group G1 having a positive power, second lens group G2 that can move along the optical axis and third lens group G3 that are two concave surfaces (s20 and s21) that are air-contacting surfaces adjacent to and facing each other. In the objective 1, from among the four surfaces consisting of the first lens surface (s9) that is the lens surface closest to the image in first lens group G1, the second lens surface (s10) that is the lens surface closest to the object in second lens group G2, the third lens surface (s11) that is the lens surface closest to the image in the second lens group and the fourth lens surface (s12) that is the lens surface closest to the object in third lens group G3, only the fourth lens surface is a concave surface.

First lens group G1 includes a plurality of single lenses (lenses L1 and L2). Specifically, the first lens group includes, in order starting from the object side, a meniscus lens (lens L1) having the concave surface on the object side, a plano-convex lens (lens L2) having the planar surface on the object side and a three-piece cemented lens CL1 in a positive-negative-positive configuration. The three-piece cemented lens includes a biconvex lens (lens L3) and two meniscus lenses (lenses L4 and L5) having the concave surfaces on the object side.

Second lens group G2 is a moving group that moves along the optical-axis directions. Second lens group G2 is a single lens (lens L6) having a positive power, and is a biconvex lens.

Third lens group G3 includes three two-piece cemented lenses (cemented lenses CL2 through CL4) and two single lenses (lenses L13 and L14). Cemented lens CL2 is a meniscus lens component having the concave surface on the object side. Cemented lens CL2 includes a biconcave lens (lens L7) and a biconvex lens (lens L8). Cemented lens CL3 is a biconvex lens component. Cemented lens CL3 includes a biconvex lens (les L9) and a meniscus lens (lens L10) having the concave surface on the object side. Cemented lens CL4 is a meniscus lens component having the concave surface on the image side. Cemented lens CL4 includes a biconvex lens (lens L11) and a biconcave lens (lens L12). Lens L13 is a meniscus lens having the concave surface on the object side. The concave surface (s21) of lens L13 is adjacent to and faces the concave surface (s20) of lens L12. Lens L14, which is closest to the image, is a single lens having a positive power, and is a biconvex lens.

The objective 1 has data as below. NA=0.78, f=4.498 mm, $f_2$=20.172 mm, $f_{31}$=18.288 mm, Δd=4.020 mm $T_{max}$=1.6 mm, $T_{min}$=0 mm, $d_{min}$=0.88 mm The objective 1 has the following lens data, with INF representing infinity (∞).

| Objective 1 | | | | |
|---|---|---|---|---|
| s | r | d | nd | νd |
| 0 | INF | D0 | 1.52287 | 59.89 |
| 1 | INF | D1 | 1 | |
| 2 | −17.2684 | 1.200 | 1.77250 | 49.60 |
| 3 | −6.8121 | 0.200 | 1 | |
| 4 | INF | 4.072 | 1.43875 | 94.93 |
| 5 | −6.1817 | 0.300 | 1 | |
| 6 | 25.0169 | 4.840 | 1.49700 | 81.54 |
| 7 | −6.1997 | 1.000 | 1.61336 | 44.49 |
| 8 | −22.6528 | 1.746 | 1.49700 | 81.54 |
| 9 | −10.3822 | D9 | 1 | |
| 10 | 48.6939 | 1.746 | 1.77250 | 49.60 |
| 11 | −22.5577 | D11 | 1 | |
| 12 | −8.3765 | 1.000 | 1.75500 | 52.32 |
| 13 | 12.7260 | 3.099 | 1.49700 | 81.54 |
| 14 | −18.2197 | 0.300 | 1 | |
| 15 | 11.6239 | 4.241 | 1.49700 | 81.54 |
| 16 | −17.1417 | 1.100 | 1.61340 | 44.27 |
| 17 | −29.4884 | 0.200 | 1 | |
| 18 | 6.9550 | 4.414 | 1.43875 | 94.93 |
| 19 | −26.2562 | 4.589 | 1.61336 | 44.49 |
| 20 | 3.1276 | 3.087 | 1 | |
| 21 | −5.0310 | 1.346 | 1.61336 | 44.49 |
| 22 | −12.7268 | 3.366 | 1 | |
| 23 | 24.2749 | 1.353 | 1.73800 | 32.26 |
| 24 | −29.6776 | 119 | 1 | |

In the above, s represents a surface number, r represents a curvature radius (mm), d represents an inter-surface distance (mm), nd represents a refractive index for a d ray, and νd represents an Abbe number. These symbols have similar meanings also in the other examples. The surface represented by surface number s0 is the object plane and also the surface of the object side of a cover glass when the cover glass is used. The surface represented by surface number s1 is the surface on the image side of a cover glass. The surfaces represented by surface numbers s2 and s24 are respectively the lens surface closest to the object in the objective 1 and the lens surface closest to the image in the objective 1. Also, for example, inter-surface distance d0 represents a distance from the surface represented by surface number s0 to the surface represented by surface number s1 on the optical axis. Inter-surface distance d24 represents a distance from the surface (surface number s24) closest to the image in the objective 1 to the surface (surface number s25) closest to the object in a tube lens 4, which will be described later.

Values D0, D1, D9 and D11 of inter-surface distances d0, d1, d9 and d11 for a case where a cover glass is not used, a case where cover glass CG1 with a thickness of 1 mm is used and a case where cover glass CG2 with a thickness of 1.6 mm is used are as below. Note that cover glasses CG1 and CG2 that are to be used are sample holding members made of glass with a refractive index $N_d$=1.52287.

| D0 (cover glass thickness) | 0 | 1.000 | 1.600 |
|---|---|---|---|
| D1 | 2.055 | 1.324 | 0.881 |
| D9 | 1.901 | 0.981 | 0.319 |
| D11 | 2.119 | 3.038 | 3.701 |

The objective 1 satisfies conditional expressions (1) through (7) as will be described later. Note that the calculation example of conditional expression (7) below is an example in which cover glass CG1 with a cover glass thickness of 1 mm shown in FIG. 1 is disposed.

$$NA=0.78 \tag{1}$$

$$|\Delta d/r_1|=0.48 \tag{2}$$

$$|\nu_1-\nu_2|=29.22 \tag{3}$$

$$f_{31}/f=4.07 \tag{4}$$

$$(T_{max}-T_{min})/N_d/d_{min}=1.20 \tag{5}$$

$$f_2/f=4.48 \tag{6}$$

$$(d_i+T_i/N_d)/f=0.44 \tag{7}$$

FIG. 2 is a sectional view of the tube lens 4 used in combination with the objective 1. The tube lens 4 includes, in order starting from the object side, cemented lens CTL1 including a biconvex lens (lens TL1) and a meniscus lens (lens TL2) having the concave surface on the object side and cemented lens CTL2 including a biconvex lens (lens TL3) and a biconcave lens (lens T4). The focal length of the tube lens 4 is 180 mm.

The tube lens 4 has the following lens data. Note that the surfaces represented by surface numbers s25 and s30 are the lens surface closest to the object and the lens surface closest to the image in the tube lens 4, respectively.

| Tube lens 4 | | | | |
|---|---|---|---|---|
| s | r | d | nd | νd |
| 25 | 68.7541 | 7.732 | 1.48749 | 70.20 |
| 26 | −37.5679 | 3.474 | 1.80610 | 40.95 |
| 27 | −102.8477 | 0.697 | 1 | |
| 28 | 84.3099 | 6.024 | 1.83400 | 37.16 |
| 29 | −50.7100 | 3.030 | 1.64450 | 40.82 |
| 30 | 40.6619 | | 1 | |

Figure 3:
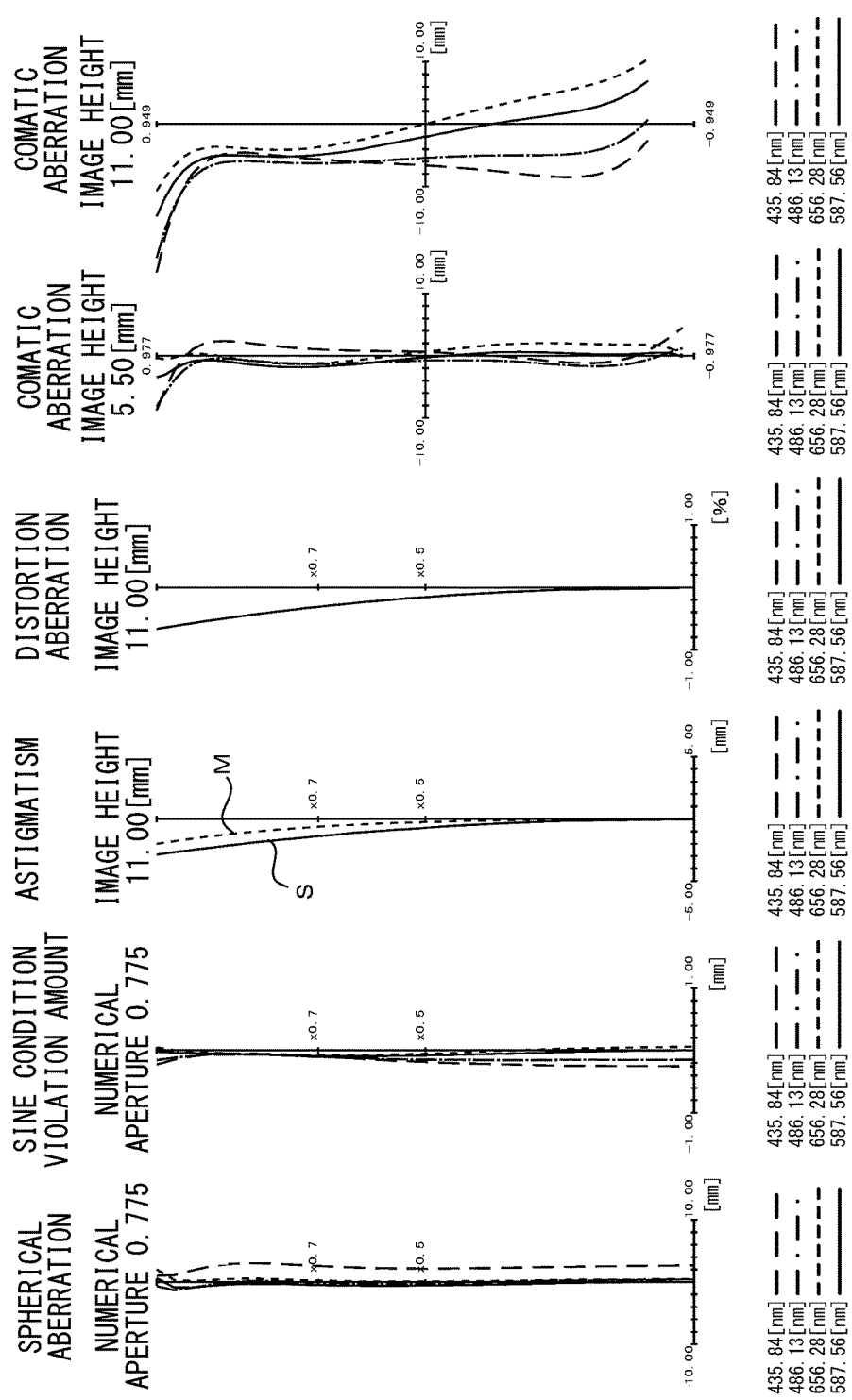
FIG. 3A through FIG. 3F are aberration diagrams in a case when the objective in example 1 and the tube lens of FIG. 2 are used in combination where the cover glass thickness is 0 mm.
Figure 4:
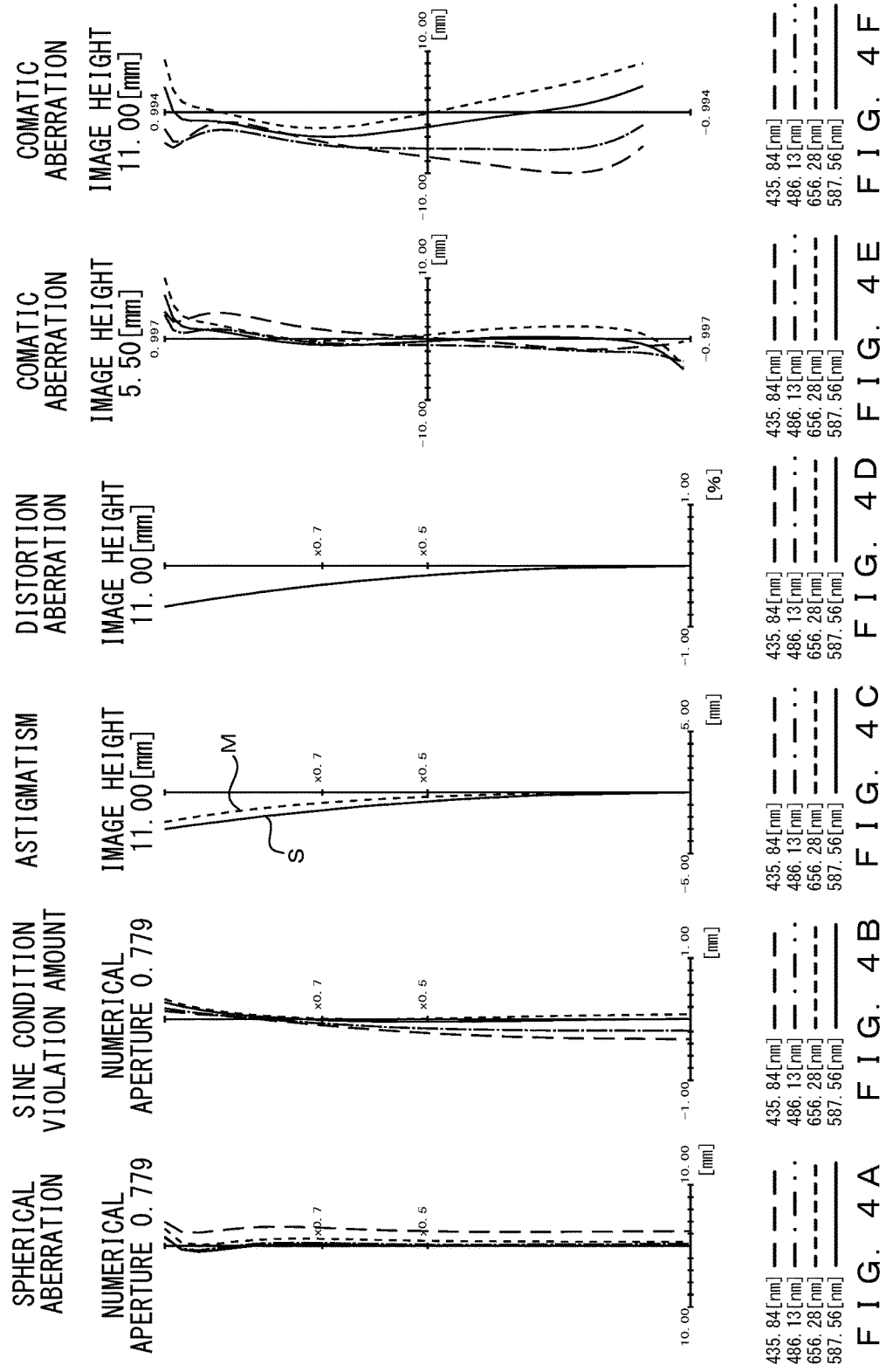
FIG. 4A through FIG. 4F are aberration diagrams in a case when the objective in example 1 and the tube lens of FIG. 2 are used in combination where the cover glass thickness is 1 mm.
Figure 5:
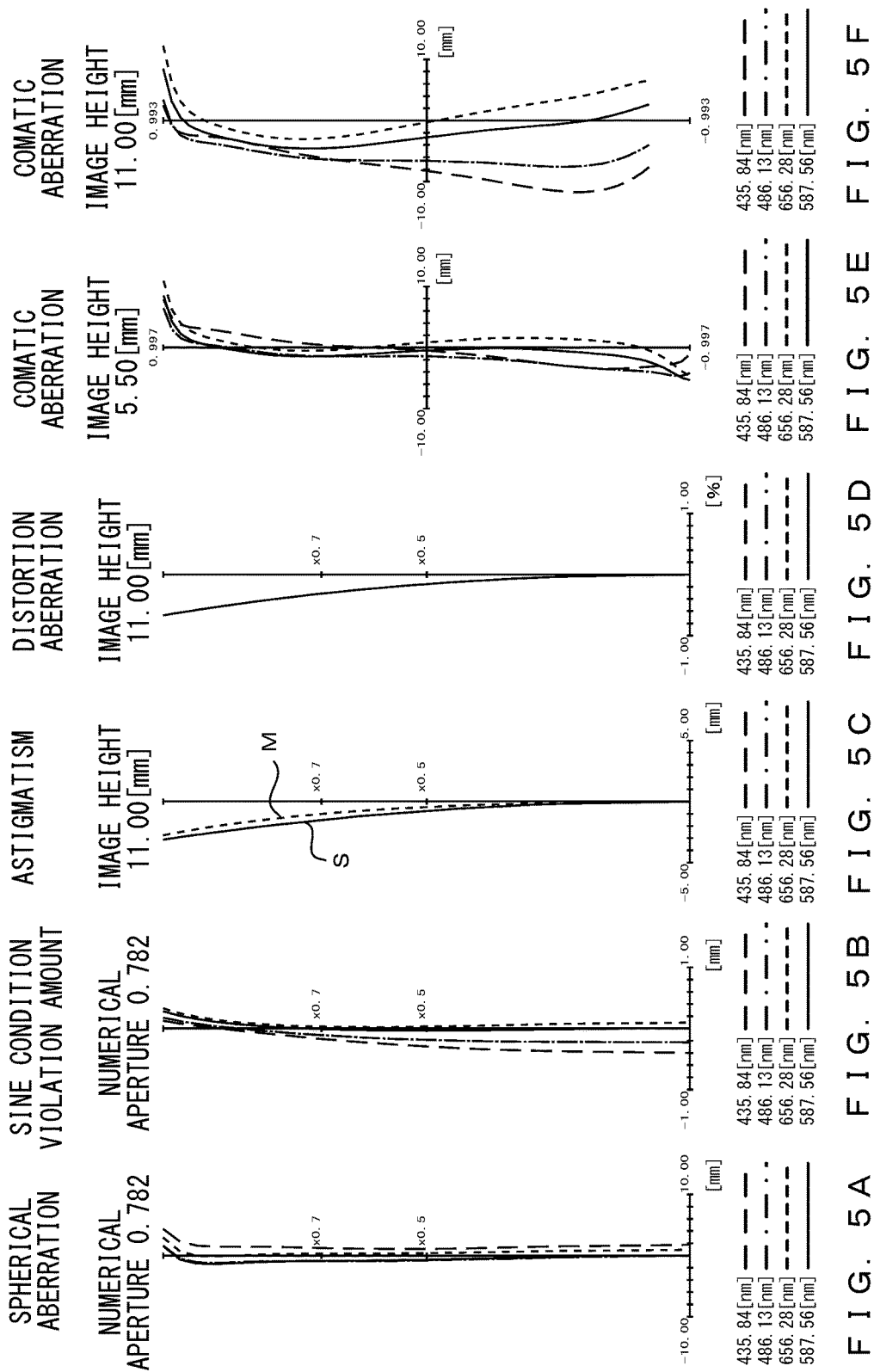
FIG. 5A through FIG. 5F are aberration diagrams in a case when the objective in example 1 and the tube lens of FIG. 2 are used in combination where the cover glass thickness is 1.6 mm.

FIG. 3A through FIG. 5F are aberration diagrams on the image plane in a case when the objective 1 and the tube lens 4 are combined. FIG. 3A through FIG. 3F, FIG. 4A through FIG. 4F and FIG. 5A through FIG. 5F are aberration diagrams respectively for cases where a cover glass is not used, where the cover glass thickness is 1 mm and where the cover glass thickness is 1.6 mm. FIG. 3A, FIG. 4A and FIG. 5A are spherical aberration diagrams. FIG. 3B, FIG. 4B and FIG. 5B represent sine condition violation amounts. FIG. 3C, FIG. 4C and FIG. 5C are astigmatism diagrams. FIG. 3D, FIG. 4D and FIG. 5D are distortion aberration diagrams. FIG. 3E, FIG. 4E and FIG. 5E are comatic aberration diagrams with an image height of 5.5 mm and FIG. 3F, FIG. 4F and FIG. 5F are comatic aberration diagrams with an image height of 11 mm. In the diagrams, "M" and "S" represent a meridional component and a sagittal component, respectively.

EXAMPLE 2

Figure 6:
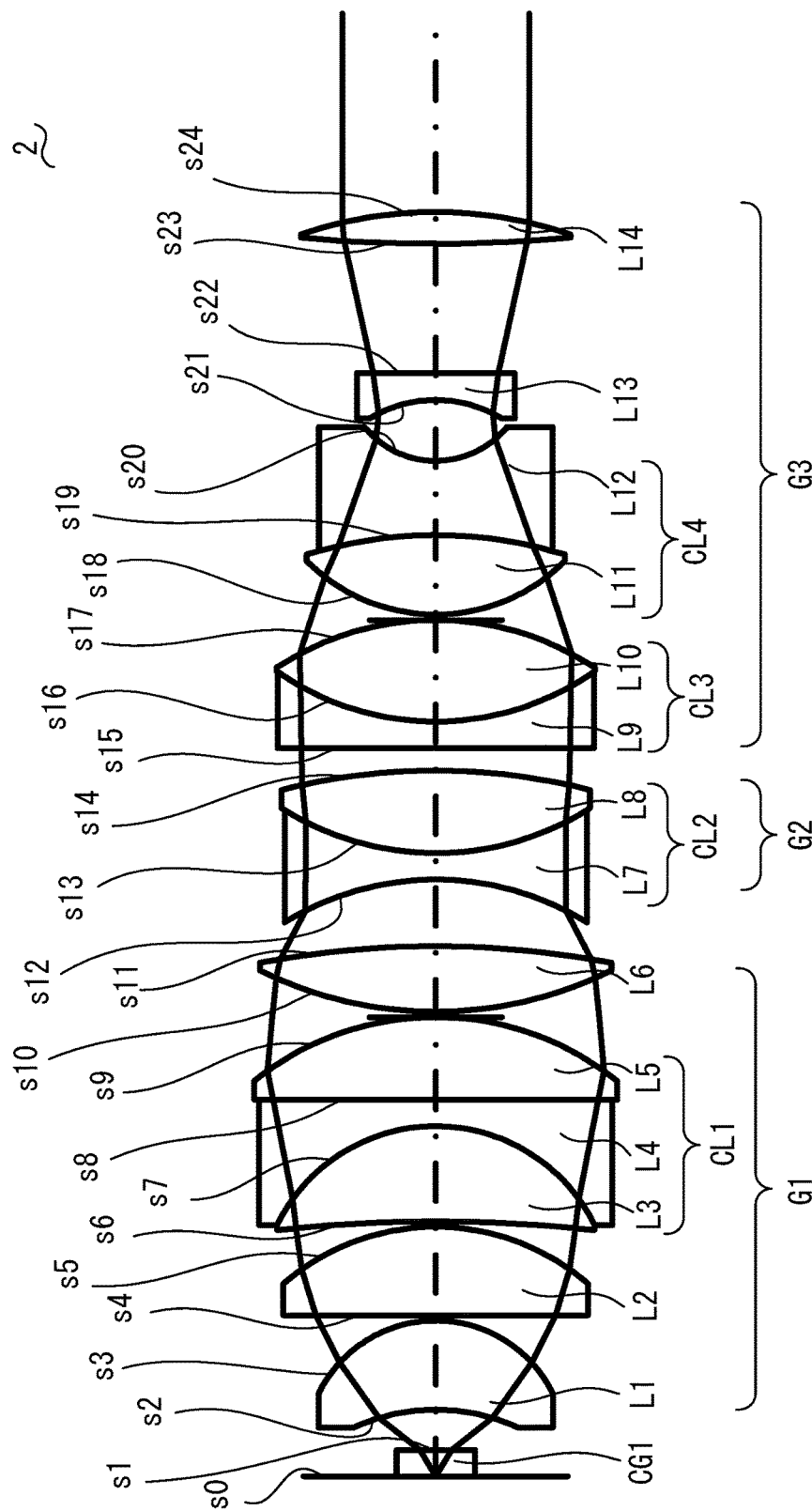
FIG. 6 is a sectional view of an objective according to example 2 where the cover glass thickness is 1 mm.

FIG. 6 is a sectional view of an objective 2 of the present example. FIG. 6 shows the lens position in a case where cover glass CG1 with a cover glass thickness of 1 mm is disposed between the sample and the objective 2.

The objective 2 is a dry microscope objective. The objective 2 includes, in order starting from the object side, first lens group G1 having a positive power, second lens group G2 that can move along the optical axis and third lens group G3 that includes two concave surfaces (s20 and s21) that are air-contacting surfaces adjacent to and facing each other. In the objective 2, from among the four surfaces consisting of the first lens surface (s11) that is the lens surface closest to the image in first lens group G1, the second lens surface (s12) that is the lens surface closest to the object in second lens group G2, the third lens surface (s14) that is the lens surface closest to the image in the second lens group and the fourth lens surface (s15) that is the lens surface closest to the object in third lens group G3, only the second lens surface is a concave surface.

First lens group G1 includes a plurality of single lenses (lenses L1, L2 and L6). Specifically, the first lens group includes, in order starting from the object side, a meniscus lens (lens L1) having the concave surface on the object side, a plano-convex lens (lens L2) having the planar surface on the object side, a three-piece cemented lens CL1 in a positive-negative-positive configuration and a biconvex lens (lens L6). The three-piece cemented lens includes a meniscus lens (lens L3) having the concave surface on the object side, a plano-concave lens (lens L4) having the planar surface on the image side and a plano-convex lens (lens L5) having the planar surface on the object side.

Second lens group G2 is a moving group that moves in the optical-axis directions. Second lens group G2 is a cemented lens CL2 including a biconcave lens (lens L7) and a biconvex lens (lens L8).

Third lens group G3 includes two pairs of two-piece cemented lenses (cemented lenses CL3 and CL4) and two single lenses (lenses L13 and L14). Cemented lens CL3 is a plano-convex lens component having the planar surface on the object side. Cemented lens CL3 includes a plano-concave lens (lens L9) having the planar surface on the object side and a biconvex lens (lens L10). Cemented lens CL4 is a meniscus lens component having the concave surface on the image side. Cemented lens CL4 includes a biconvex lens (lens L11) and a biconcave lens (lens L12). Lens L13 is a plano-concave lens having the planar surface on the image side. The concave surface (s21) of lens L13 is adjacent to and faces the concave surface (s20) of lens L12. Lens L14, disposed closest to the image, is a single lens having a positive power and is a biconvex lens.

The objective 2 has data as below. NA=0.78, f=4.500 mm, $f_2=-14.091$ mm, $f_{31}=16.838$ mm, $\Delta d=3.354$ mm $T_{max}=1.6$ mm, $T_{min}=0$ mm, $d_{min}=1.01$ mm The objective 2 has the following lens data.

| | | Objective 2 | | |
|---|---|---|---|---|
| s | r | d | nd | vd |
| 0 | INF | D0 | 1.52287 | 59.89 |
| 1 | INF | D1 | 1 | |
| 2 | −7.3994 | 3.357 | 1.77250 | 49.60 |
| 3 | −4.9432 | 0.200 | 1 | |
| 4 | INF | 3.342 | 1.49700 | 81.54 |
| 5 | −8.7867 | 0.200 | 1 | |
| 6 | −56.5654 | 3.601 | 1.49700 | 81.54 |
| 7 | −6.6989 | 1.000 | 1.61336 | 44.49 |
| 8 | INF | 3.121 | 1.59522 | 67.74 |
| 9 | −10.9611 | 0.200 | 1 | |
| 10 | 14.8943 | 2.487 | 1.59522 | 67.74 |
| 11 | −34.4089 | D11 | 1 | |
| 12 | −10.9077 | 1.000 | 1.77250 | 49.60 |
| 13 | 10.8866 | 3.122 | 1.49700 | 81.54 |
| 14 | −23.5936 | D14 | 1 | |
| 15 | INF | 1.000 | 1.61336 | 44.49 |
| 16 | 10.4604 | 3.840 | 1.59522 | 67.74 |
| 17 | −10.9422 | 0.200 | 1 | |
| 18 | 6.8996 | 3.010 | 1.43875 | 94.93 |
| 19 | −16.4958 | 2.798 | 1.61336 | 44.49 |
| 20 | 3.4795 | 2.310 | 1 | |
| 21 | −4.8037 | 1.000 | 1.61336 | 44.49 |
| 22 | INF | 4.893 | 1 | |
| 23 | 56.1482 | 1.198 | 1.73800 | 32.26 |
| 24 | −15.8142 | 119 | 1 | |

Values D0, D1, D11 and D14 of inter-surface distances d0, d1, d11 and d14 for a case where a cover glass is not used, a case where cover glass CG1 with a thickness of 1 mm is used and a case where cover glass CG2 with a thickness of 1.6 mm is used are as below. Note that cover glasses CG1 and CG2 that are to be used for the observation are sample holding members made of glass with a refractive index $N_d=1.52287$.

| D0 (cover glass thickness) | 0 | 1.000 | 1.600 |
|---|---|---|---|
| D1 | 2.364 | 1.532 | 1.012 |
| D11 | 1.693 | 2.509 | 3.157 |
| D14 | 1.662 | 0.845 | 0.198 |

The objective 2 satisfies conditional expressions (1) through (7) except for conditional expression (6) as will be described later. Note that the calculation example of conditional expression (7) below is an example in which cover glass CG1 with a cover glass thickness of 1 mm shown in FIG. 6 is disposed.

$$NA=0.79 \quad (1)$$

$$|\Delta d/r_1|=0.31 \quad (2)$$

$$|v_1-v_2|=31.94 \quad (3)$$

$$f_{31}/f=3.74 \quad (4)$$

$$(T_{max}-T_{min})/N_d/d_{min}=1.04 \quad (5)$$

$$f_2/f=-3.13 \quad (6)$$

$$(d_i+T_i/N_d)/f=0.49 \quad (7)$$

Figure 7:
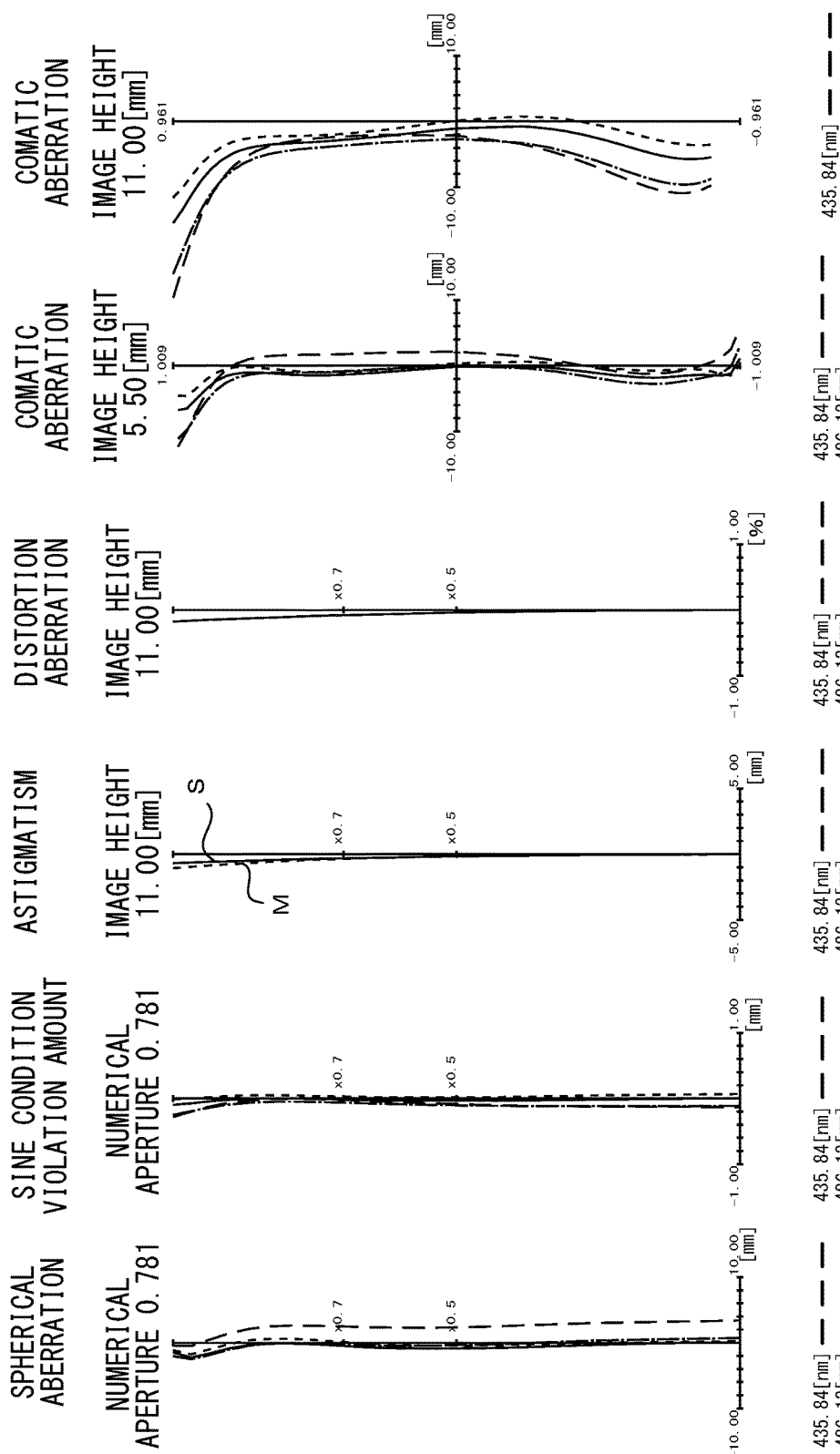
FIG. 7A through FIG. 7F are aberration diagrams in a case when the objective in example 2 and the tube lens of FIG. 2 are used in combination where the cover glass thickness is 0 mm.
Figure 8:
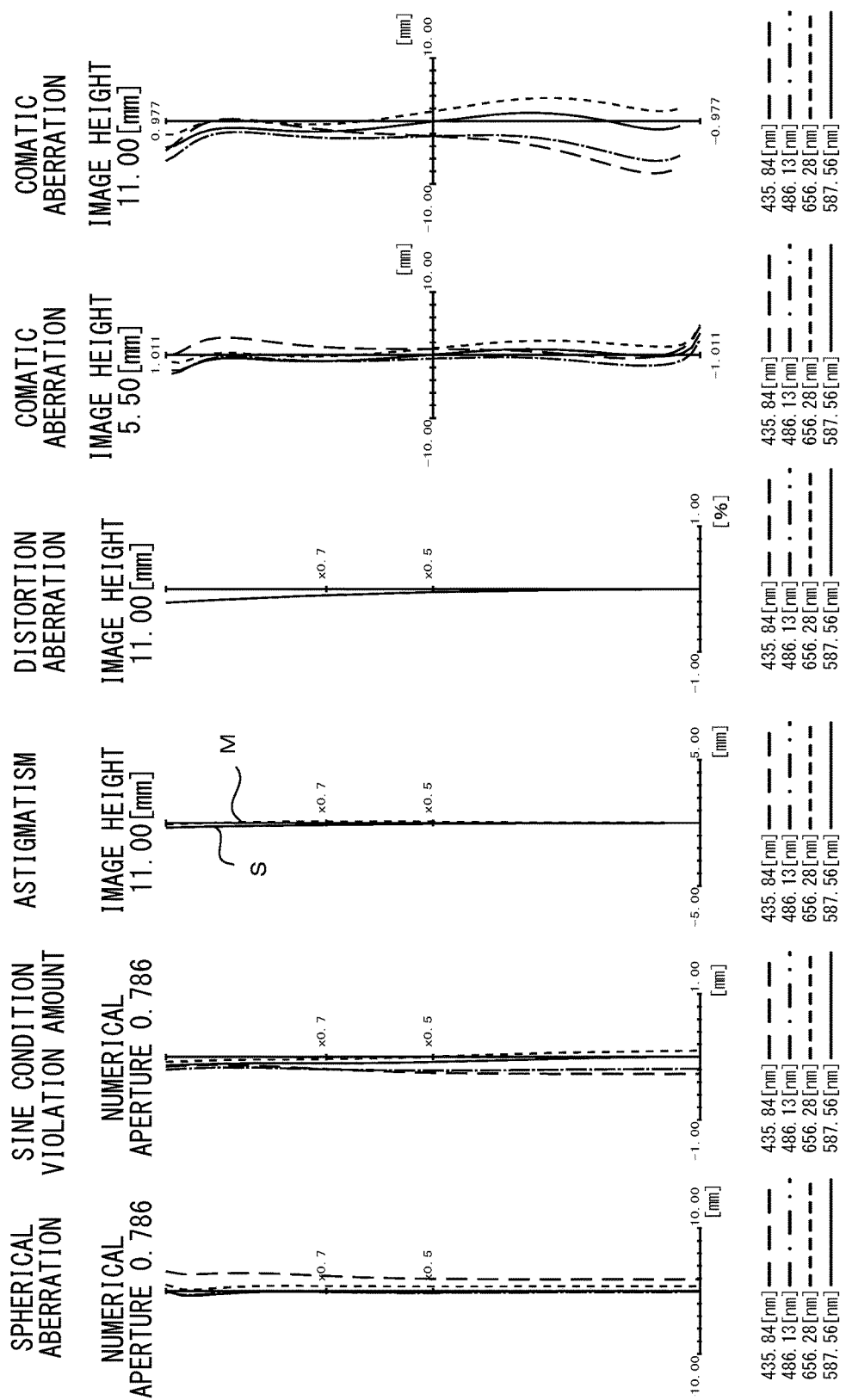
FIG. 8A through FIG. 8F are aberration diagrams in a case when the objective in example 2 and the tube lens of FIG. 2 are used in combination where the cover glass thickness is 1 mm.
Figure 9:
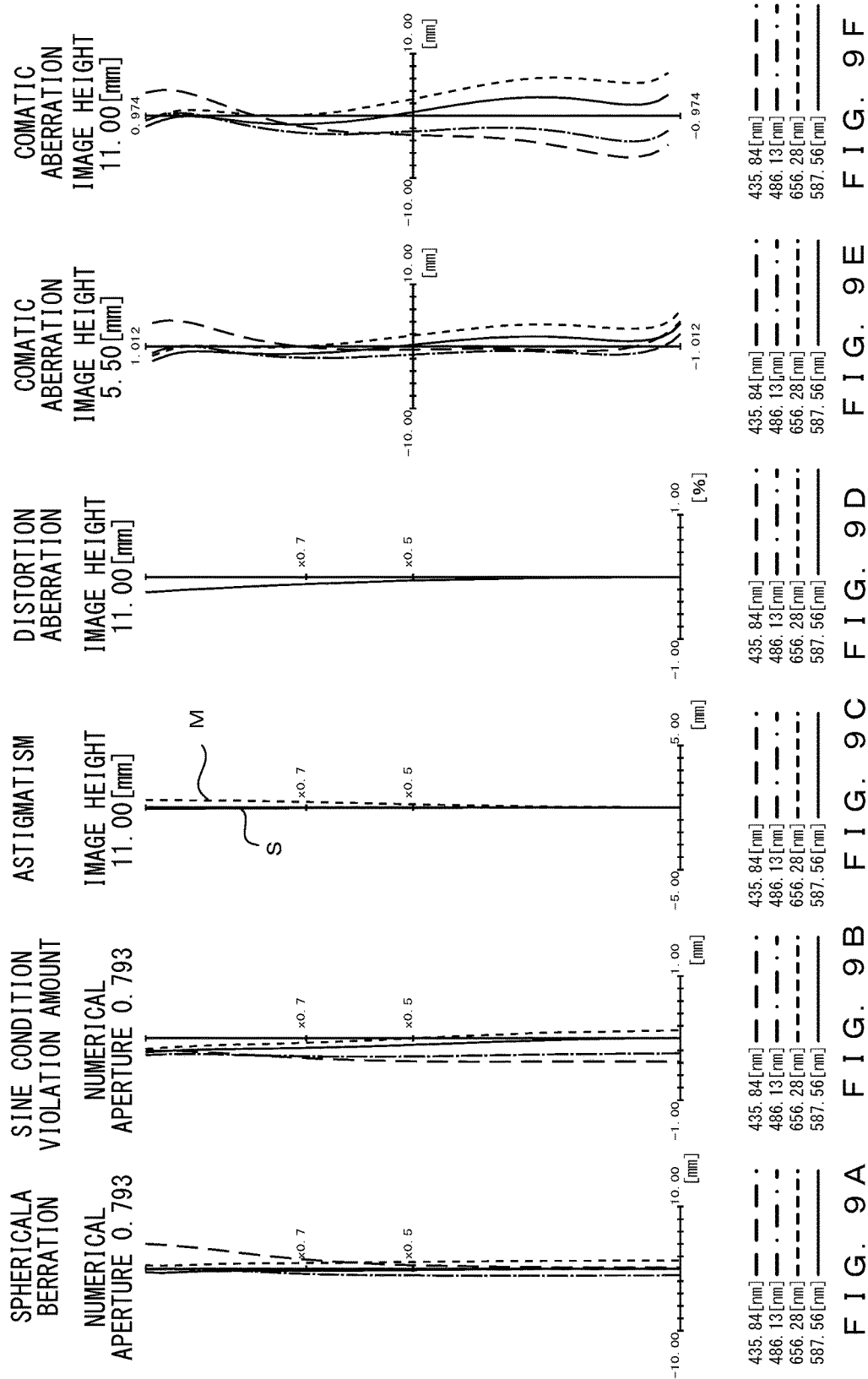
FIG. 9A through FIG. 9F are aberration diagrams in a case when the objective in example 2 and the tube lens of FIG. 2 are used in combination where the cover glass thickness is 1.6 mm.

FIG. 7A through FIG. 9F are aberration diagrams on the image plane in a case when the objective 2 and the tube lens 4 are combined. FIG. 7A through FIG. 7F, FIG. 8A through FIG. 8F and FIG. 9A through FIG. 9F are aberration diagrams respectively for cases where a cover glass is not used, where the cover glass thickness is 1 mm and where the cover glass thickness is 1.6 mm. FIG. 7A, FIG. 8A and FIG. 9A are spherical aberration diagrams. FIG. 7B, FIG. 8B and FIG. 9B represent sine condition violation amounts. FIG. 7C, FIG. 8C and FIG. 9C are astigmatism diagrams. FIG. 7D, FIG. 8D and FIG. 9D are distortion aberration diagrams. FIG. 7E, FIG. 8E and FIG. 9E are comatic aberration diagrams with an image height of 5.5 mm and FIG. 7F, FIG. 8F and FIG. 9F are comatic aberration diagrams with an image height of 11 mm. In the diagrams, "M" and "S" represent a meridional component and a sagittal component, respectively.

EXAMPLE 3

Figure 10:
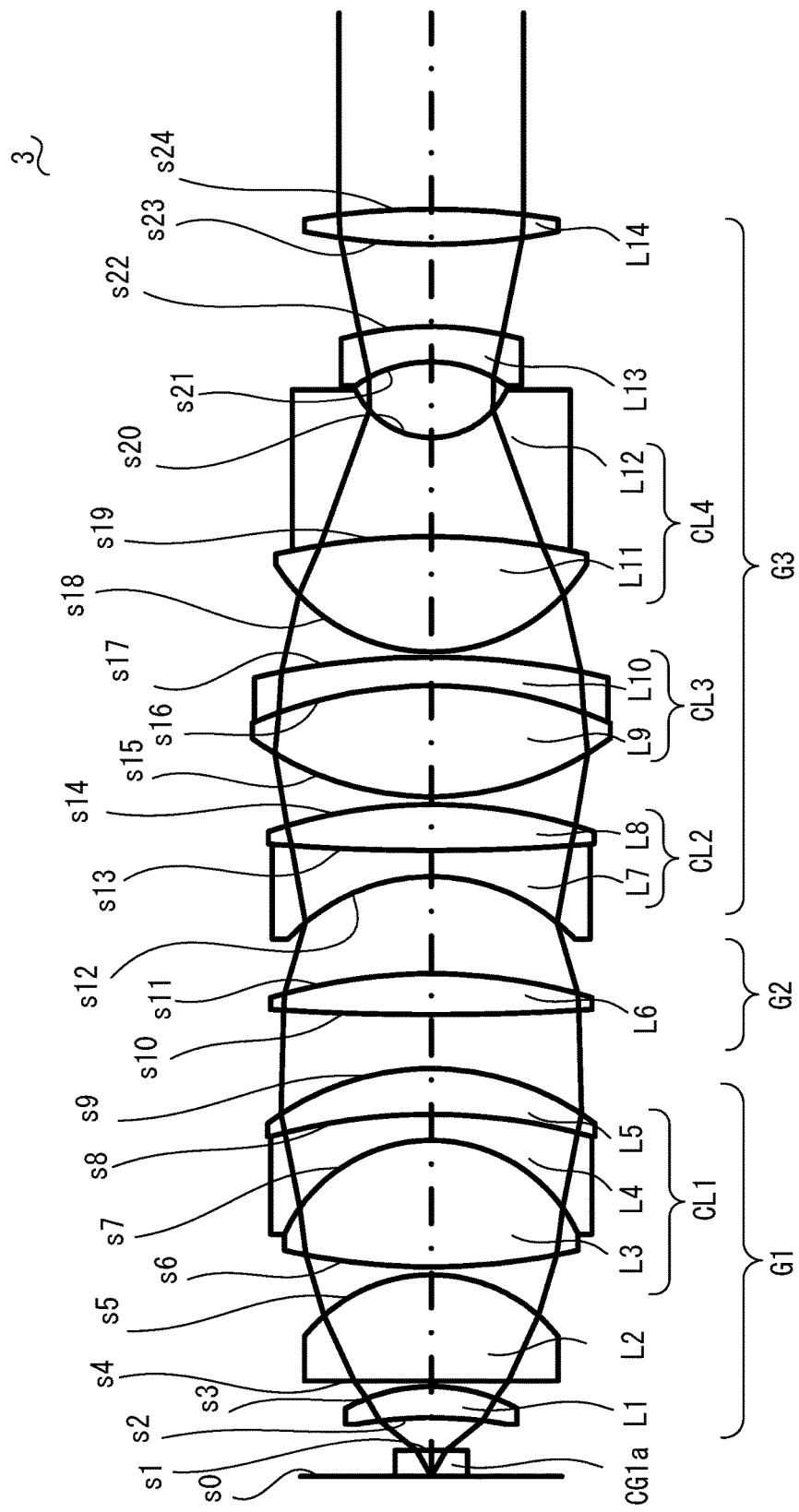
FIG. 10 is a sectional view of an objective according to example 3 where the cover glass thickness is 1 mm.

FIG. 10 is a sectional view of an objective 3 of the present example. FIG. 10 shows the lens position in a case where cover glass CG1a with a cover glass thickness of 1 mm is disposed between the sample and the objective 3.

The objective 3 is a dry microscope objective. The objective 3 includes, in order starting from the object side, first lens group G1 having a positive power, second lens group G2 that can move along the optical axis and third lens group G3 that includes two concave surfaces (s20 and s21) that are air-contacting surfaces adjacent to and facing each other. In the objective 3, from among the four surfaces consisting of the first lens surface (s9) that is the lens surface closest to the image in first lens group G1, the second lens surface (s10) that is the lens surface closest to the object in second lens group G2, the third lens surface (s11) that is the lens surface closest to the image in the second lens group and the fourth lens surface (s12) that is the lens surface closest to the object in third lens group G3, only the fourth lens surface is a concave surface.

First lens group G1 includes a plurality of single lenses (lenses L1 and L2). Specifically, the first lens group includes, in order starting from the object side, a meniscus lens (lens L1) having the concave surface on the object side, a plano-convex lens (lens L2) having the planar surface on the object side and a three-piece cemented lens CL1 in a positive-negative-positive configuration. The three-piece cemented lens CL1 includes a biconvex lens (lens L3) and two meniscus lenses (lenses L4 and L5) having the concave surfaces on the object side.

Second lens group G2 is a moving group that moves along the optical-axis directions. Second lens group G2 is a single lens (lens L6) having a positive power, and is a biconvex lens.

Third lens group G3 includes three pairs of three two-piece cemented lenses (cemented lenses CL2 through CL4) and two single lenses (lenses L13 and L14). Cemented lens CL2 is a meniscus lens component having the concave surface on the object side. Cemented lens CL2 includes a biconcave lens (lens L7) and a biconvex lens (lens L8). Cemented lens CL3 is a biconvex lens component. Cemented lens CL3 includes a biconvex lens (les L9) and a meniscus lens (lens L10) having the concave surface on the object side. Cemented lens CL4 is a meniscus lens component having the concave surface on the image side. Cemented lens CL4 includes a biconvex lens (lens L11) and a biconcave lens (lens L12). Lens L13 is a meniscus lens having the concave surface on the object side. The concave surface (s21) of lens L13 is adjacent to and faces the concave surface (s20) of lens L12. Lens L14, which is closest to the image, is a single lens having a positive power, and is a biconvex lens.

The objective 3 has data as below. NA=0.78, f=4.501 mm, $f_2$=23.460 mm, $f_{31}$=18.288 mm, Δd=5.777 mm $T_{max}$=1.6 mm, $T_{min}$=0 mm, $d_{min}$=0.84 mm The objective 3 has the following lens data.

| Objective 3 | | | | |
|---|---|---|---|---|
| s | r | d | nd | vd |
| 0 | INF | D0 | 1.59108 | 30.85 |
| 1 | INF | D1 | 1 | |
| 2 | −17.2684 | 1.200 | 1.77250 | 49.60 |
| 3 | −6.8121 | 0.200 | 1 | |
| 4 | INF | 4.072 | 1.43875 | 94.93 |
| 5 | −6.1817 | 0.300 | 1 | |
| 6 | 25.0169 | 4.840 | 1.49700 | 81.54 |
| 7 | −6.1997 | 1.000 | 1.61336 | 44.49 |
| 8 | −22.6528 | 1.746 | 1.49700 | 81.54 |
| 9 | −10.3822 | D9 | 1 | |
| 10 | 93.3900 | 1.567 | 1.73800 | 32.26 |
| 11 | −21.1025 | D11 | 1 | |
| 12 | −7.4864 | 1.000 | 1.67300 | 38.15 |
| 13 | 76.7826 | 1.757 | 1.49700 | 81.54 |
| 14 | −19.1575 | 0.300 | 1 | |
| 15 | 11.6239 | 4.241 | 1.49700 | 81.54 |
| 16 | −17.1417 | 1.100 | 1.6134 | 44.27 |
| 17 | −29.4884 | 0.200 | 1 | |
| 18 | 6.9550 | 4.414 | 1.43875 | 94.93 |
| 19 | −26.2562 | 3.783 | 1.61336 | 44.49 |
| 20 | 3.2103 | 2.900 | 1 | |
| 21 | −5.0310 | 1.346 | 1.61336 | 44.49 |
| 22 | −12.7268 | 3.145 | 1 | |
| 23 | 24.2749 | 1.353 | 1.73800 | 32.26 |
| 24 | −29.6776 | 119 | 1 | |

Values D0, D1, D9 and D11 of inter-surface distances d0, d1, d9 and d11 for a case where a cover glass is not used, a case where cover glass CG1a with a thickness of 1 mm is used and a case where cover glass CG2a with a thickness of 1.6 mm is used are as below. Note that cover glasses CG1a and CG2a that are to be used for the observation are sample holding members made of plastic with a refractive index $N_d$=1.59108.

| | | | |
|---|---|---|---|
| D0 (cover glass thickness) | 0 | 1.000 | 1.600 |
| D1 | 1.933 | 1.250 | 0.838 |
| D9 | 3.218 | 2.063 | 1.232 |
| D11 | 2.559 | 3.714 | 4.545 |

The objective 3 satisfies conditional expressions (1) through (7) as will be described later. Note that the calculation example of conditional expression (7) below is an example in which cover glass CG1a with a cover glass thickness of 1 mm shown in FIG. 10 is disposed.

$$NA=0.78 \tag{1}$$

$$|\Delta d/r_1|=0.77 \tag{2}$$

$$|v_1-v_2|=43.39 \tag{3}$$

$$f_{31}/f=4.06 \tag{4}$$

$$(T_{max}-T_{min})/N_d/d_{min}=1.20 \tag{5}$$

$$f_2/f=5.21 \tag{6}$$

$$(d_i+T_i/N_d)/f=0.42 \tag{7}$$

FIG. 11A through FIG. 13F are aberration diagrams on the image plane in a case when the objective 3 and the tube lens 4 are combined. FIG. 11A through FIG. 11F, FIG. 12A through FIG. 12F and FIG. 13A through FIG. 13F are aberration diagrams respectively for cases where a cover glass is not used, where the cover glass thickness is 1 mm and where the cover glass thickness is 1.6 mm. FIG. 11A, FIG. 12A and FIG. 13A are spherical aberration diagrams. FIG. 11B, FIG. 12B and FIG. 13B represent sine condition violation amounts. FIG. 11C, FIG. 12C and FIG. 13C are astigmatism diagrams. FIG. 11D, FIG. 12D and FIG. 13D are distortion aberration diagrams. FIG. 11E, FIG. 12E and FIG. 13E are comatic aberration diagrams with an image height of 5.5 mm and FIG. 11F, FIG. 12F and FIG. 13F are comatic aberration diagrams with an image height of 11 mm. In the diagrams, "M" and "S" represent a meridional component and a sagittal component, respectively.

What is claimed is:

1. A dry microscope objective comprising in order starting from an object side:
    a first lens group, having a positive power, that includes a plurality of single lenses;
    a second lens group that is moveable along an optical axis; and
    a third lens group including two concave surfaces that are air-contacting surfaces adjacent to and facing each other,
    wherein:
    only one surface is a concave surface from among four surfaces consisting of a first lens surface that is a lens surface closest to an image in the first lens group, a second lens surface that is a lens surface closest to an object in the second lens group, a third lens surface that is a lens surface closest to the image in the second lens group, and a fourth lens surface that is a lens surface closest to the object in the third lens group, and
    the dry microscope objective satisfies $$0.66 \leq NA \leq 1 \tag{1}$$

$$0.2 < |\Delta d/r_1| < 1 \tag{2}$$

where NA is a numerical aperture on the object side of the dry microscope objective, $\Delta d$ is a sum of a lens interval between the first and second lens surfaces and a lens interval between the third and fourth lens surfaces when the second lens group is located at any one position along the optical axis to which the second lens group is moveable, and $r_1$ is a curvature radius of a lens surface that is the concave surface from among the four surfaces, and
    wherein $\Delta d$ does not vary, regardless of a position of the second lens group along the optical axis,
    whereby $$0.2 < |\Delta d/r_1| < 1 \tag{2}$$

is satisfied for all positions along the optical axis to which the second lens group is moveable.

2. The dry microscope objective according to claim 1, wherein
    a lens component including the concave surface from among the four surfaces is a two-piece cemented lens, and the dry microscope objective satisfies $$25 < |\nu_1 - \nu_2| < 50 \tag{3}$$

where $\nu_1$ is an Abbe number of a lens including the concave surface and $\nu_2$ is an Abbe number of a lens cemented together with the lens including the concave surface.

3. The dry microscope objective according to claim 1, wherein the first lens group includes a three-piece cemented lens in which a positive lens, a negative lens and a positive lens are cemented together in order starting from the object side.

4. The dry microscope objective according to claim 1, wherein
    the third lens group includes, closest to the image, a single lens having a positive power, and
    the dry microscope objective satisfies $$3 < f_{31}/f < 5 \tag{4}$$

where f is a focal length of the dry microscope objective and $f_{31}$ is a focal length of the single lens included in the third lens group.

5. A microscope system comprising the dry microscope objective according to claim 1, wherein:
    the dry microscope objective satisfies $$0.6 < (T_{max} - T_{min})/N_d/d_{min} < 3.0 \tag{5}$$

where $T_{max}$ and $T_{min}$ are respectively maximum and minimum values of a thicknesses of a sample holding member that is designated by a specification of the dry microscope objective, $N_d$ is a refractive index of a sample holding member used for observation and $d_{min}$ is an optical working distance when a sample holding member with a thickness of $T_{max}$ is used, wherein the optical working distance is a distance on the optical axis from a surface closest to the object in the dry microscope objective to a surface closest to the image in the sample holding member in the microscope system.

6. The dry microscope objective according to claim 1, wherein
    the second lens group is a single lens having a positive power, and the dry microscope objective satisfies $$4 < f_2/f < 6 \tag{6}$$

where f is a focal length of the dry microscope objective and $f_2$ is a focal length of the second lens group.

7. A microscope system comprising the dry microscope objective according to claim 1,
    wherein the dry microscope objective satisfies $$0.3 < (d_i + T_i/N_d)/f < 0.77 \tag{7}$$

where $d_i$ is an optical working distance when a sample holding member with a refractive index of $N_d$ and a thickness of $T_i$ is used for observation in the microscope system, and f is a focal length of the dry microscope objective, wherein the optical working distance is a distance on the optical axis from a surface closest to the object in the dry microscope objective to a surface closest to the image in the sample holding member in the microscope system.

* * * * *